J. FRITZ & W. C. POOLEY.
Machines for Introducing Water and Gas-Pipes.
No. 139,566. Patented June 3, 1873.
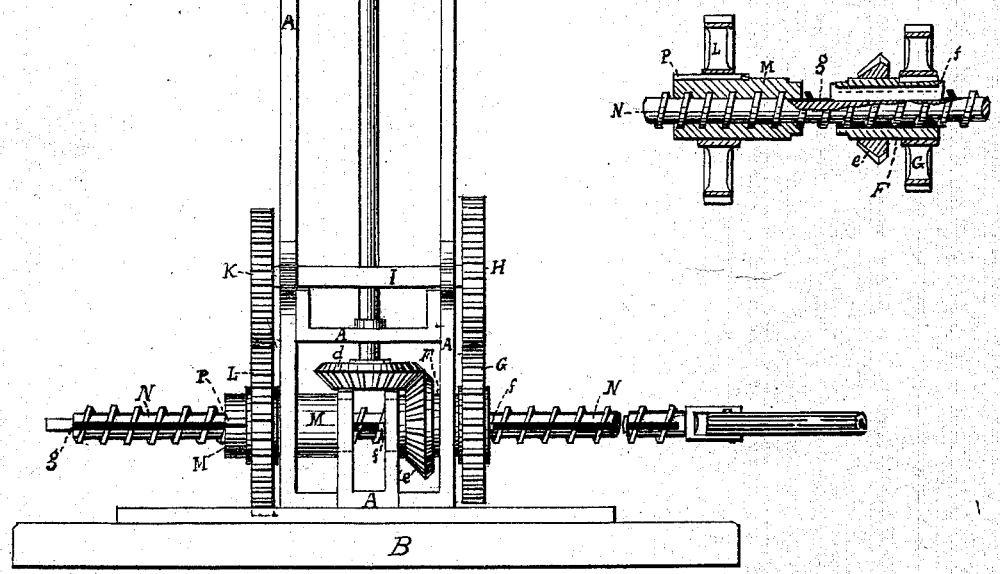

UNITED STATES PATENT OFFICE.

JOHN FRITZ AND WILLIAM C. POOLEY, OF MEMPHIS, TENNESSEE.

IMPROVEMENT IN MACHINES FOR INTRODUCING WATER AND GAS PIPES.

Specification forming part of Letters Patent No. 139,566, dated June 3, 1873; application filed February 10, 1873.

*To all whom it may concern:*

Be it known that we, JOHN FRITZ and WILLIAM C. POOLEY, of Memphis, in the county of Shelby and in the State of Tennessee, have invented certain new and useful improvements in apparatus for boring horizontally under streets, sidewalks, &c., for the introduction of gas and water service-pipes, without disturbing the surface; and we do hereby declare that the following is a full, clear, and exact description thereof, reference being had to the accompanying drawing and to the letters of reference marked thereon.

The nature of our invention consists in the construction of a machine consisting of several gear-wheels and an auger operated by hand-cranks or other means, the wheels by which the auger is rotated and moved forward having a differential motion, the object being to bore holes from the main under the pavement to the house, or from the house to the main, for laying gas and water service-pipes without disturbing the pavement, as will more fully hereinafter appear. To enable those skilled in the art to which it pertains to make and use our invention, we will proceed to more fully describe its construction and operation.

In the drawings, Figure 1 is a front elevation of our invention, and Fig. 2 is a detail view of the same.

A A represent the frame, which is preferably made mostly of cast-iron, firmly secured to the foundation or platform B, made of wood, on which the operators of the machine are to stand, and so hold the machine steady while operating it. C is the crank-shaft, which is turned by the cranks $c$ $c$; and on this shaft we firmly secure a miter-wheel, $a$, by which to turn the miter-wheel $b$ on the vertical shaft D. This shaft D is suitably secured, and has at its lower end a miter-wheel, $d$, that gears into miter-wheel $e$ on the cylinder F, which has its bearings in the frame A, and as it, F, revolves turn the cog-wheel G which is keyed on the cylinder F. This wheel G has, say, forty-one teeth that mesh into cog-wheel H with the same number of teeth, and the latter wheel H is firmly keyed on shaft I whose bearings are preferably on the frame A as indicated. On the opposite end of the counter-shaft I is a wheel, K, with twenty-six teeth gearing into the wheel L provided with fifty-four cogs, keyed by key P securely to the nut M, when the machine is in operation. When it is desired to throw the machine out of gear this wheel L is unkeyed and slid out of gear with wheel K, and the sidewise motion of the auger N is stopped; for by nut M the auger N is fed in or drawn back, the nut M acting upon the auger N to give it a sidewise motion, while the feather $f$ in the cylinder F (by reason of its $f$ fitting into a slot, $g$, in the auger N,) causes the auger to revolve and cut its way through the ground. With the cog-wheels provided with the number of teeth above-mentioned, (the thread of the auger being cut with one inch pitch, and the auger being formed to cut a hole two and a half inches in diameter,) the nut M would be revolved by the wheel L three-fourths as fast as the cylinder F revolves. The auger N is made in sections, say four and a half feet long, and the slot $g$ extends the whole length of each section. Each successive section is screwed onto the section bored into the earth and then pinned to it. Different cutters are put on in the same manner.

To operate our machine when constructed as above: The hole having been made in the street at which the connection of a gas or water service-pipe is to be made, the machine may be operated from the hole in the street, or, if more convenient, from the cellar, to where the gas or water is to be conveyed. Having placed the machine upon its foundation or platform, B, one or more men turn the cranks $c$ $c$ while standing on said platform. Motion is transmitted from the cranks $c$ to crank-shaft C and miter-wheel $a$, and thence through miter-wheel $b$, shaft D, miter-wheels $d$ and $e$, to cylinder F. This cylinder, by means of its feather-key $f$ fitting in the slot $g$ causes the auger N to revolve; and cylinder F also conveys motion through cog-wheels G and H, counter-shaft I, and cog-wheel K, to the cog-wheel L, which then turns the nut M, and that feeds the first section of the auger with the bit forward, this section having been screwed by its thread into nut M just before turning the cranks. After one section is bored in, a second section is screwed and pinned to the first section, or secured by any other suitable means; and the second section having been bored in its length, the third section is in like manner secured to the second section as that was to the first section; and so on until the bit or head of the auger makes its way into the cellar or the hole in the street. By this means a clean hole will be formed about the size of the pipe to be laid as the earth is bored out of the hole. The hole is now made, and without disturbing the pavement of the street and consequent inconvenience to the public. To lay the pipe in this hole, that forms a substitute for the dangerous, costly, and travel-obstructing trench, a joint of the pipe to be laid is suitably secured to the now protruding bit or cutting end of the auger, and the cranks c c have a reverse motion given them, causing the shafts, wheels, cylinder, and nut to have a like reverse motion, thus withdrawing the auger, which draws with it the first joint of pipe; a second joint is then secured in the proper manner to the first joint and drawn into the auger hole; a third joint is attached to the second joint and drawn in; and so on till the desired length of pipe from the main to the house is laid; or, the pipe may be forced through the hole after the auger is withdrawn.

We believe ourselves to be the first to put in practice the conception of laying water and gas street-service pipes without trenching the road or sidewalk; and

Having thus fully described our invention embodying that conception, what we claim as new, and desire to secure by Letters Patent, is—

The combination of the vertical shaft D, gears d e, screw-threaded auger-shaft N, rotating cylinder F, feeding cylinder M, differential gearing G H K L, frame A, and platform B, when constructed in the manner set forth, for the purpose of boring horizontally under the streets and sidewalks for the insertion of gas and water pipes without disturbing the surface, substantially as specified.

In testimony that we claim the above-described invention, to wit, horizontal trenches, we have hereunto signed our names this 13th day of February, 1873.

JOHN FRITZ.
WM. C. POOLEY.

Witnesses:
M. B. TREZEVANT,
F. D. BARNUM.